(12) United States Patent
Tanner

(10) Patent No.: US 7,017,266 B1
(45) Date of Patent: Mar. 28, 2006

(54) LOCATOR WIRE TERMINATOR

(75) Inventor: William A. Tanner, Metropolis, IL (US)

(73) Assignee: T-Squared, Inc., Metropolis, IL (US)

(*) Notice: Subject to any disclaimer, the term of this patent is extended or adjusted under 35 U.S.C. 154(b) by 186 days.

(21) Appl. No.: 10/998,413

(22) Filed: Nov. 29, 2004

Related U.S. Application Data

(62) Division of application No. 10/180,748, filed on Jun. 26, 2002, now Pat. No. 6,825,415.
(60) Provisional application No. 60/301,003, filed on Jun. 26, 2001.

(51) Int. Cl.
    *H02G 9/00* (2006.01)

(52) U.S. Cl. .................. 29/857; 174/39; 174/65.1; 174/68.3; 174/25.1; 29/857; 29/564.1; 29/749
(58) Field of Classification Search .......... 174/37, 174/39, 65.1, 68.3, 25.1; 29/857, 564.1, 749
See application file for complete search history.

(56) References Cited

U.S. PATENT DOCUMENTS

| | | | |
|---|---|---|---|
| 2,958,843 A | 11/1960 | Long | |
| 3,055,970 A | 9/1962 | Handley | |
| 3,676,567 A | 7/1972 | Zinn | |
| 3,746,034 A | 7/1973 | Cosson | |
| 4,151,458 A | 4/1979 | Seager | |
| 4,346,254 A | 8/1982 | Borin et al. | |
| 4,449,098 A | 5/1984 | Nakamura et al. | |
| 4,621,476 A | 11/1986 | MacGregor | |
| 4,767,237 A | 8/1988 | Cosman et al. | |
| 4,885,428 A | 12/1989 | Roberts | |
| 5,298,894 A | 3/1994 | Cerny et al. | |
| 5,771,835 A | 6/1998 | Schneider | |
| 6,084,393 A | 7/2000 | Yankielun | |
| 6,286,542 B1 | 9/2001 | Morain et al. | |
| 6,351,126 B1 | 2/2002 | Belew et al. | |
| 6,750,401 B1 * | 6/2004 | Vokey | 174/120 R |

* cited by examiner

*Primary Examiner*—Anthony Dinkins
*Assistant Examiner*—Jinhee Lee
(74) *Attorney, Agent, or Firm*—King & Schickli, PLLC

(57) ABSTRACT

Methods for electrical isolation of a locator wire for locating the position of a utility conveyance include, in one aspect, the steps of positioning at least one locator wire in substantial alignment with the utility conveyance, and placing the locator wire in electrical communication with an electrically conductive terminal at least partially enclosed within an electrically isolating sheath. In another aspect, a method is provided for locating a utility conveyance, including the positioning at least one locator wire in substantial alignment with at least a portion of the utility conveyance and placing an electrically conductive terminal in electrical communication with an end of the locator wire. The terminal is separate from the locator wire and further is at least partially enclosed within an electrically isolating sheath. A detectable signal may then be applied to the locator wire through the terminal, and the location of the utility conveyance may be ascertained with a detector.

18 Claims, 5 Drawing Sheets

LOCATOR WIRE TERMINATOR

This application claims the benefit of U.S. Provisional Patent Application Ser. No. 60/301,003, filed Jun. 26, 2001, and is a division of U.S. patent application Ser. No. 10/180,748, filed on Jun. 26, 2002, now U.S. Pat. No. 6,825,415, which is incorporated herein by reference.

TECHNICAL FIELD

The present invention relates to systems for terminating underground utility locator or trace wires. The invention relates more particularly to methods for terminating an underground utility locator wire that electrically isolate the wire to reduce the risk of signal bleed or transfer, protect the locator wire from damage, and reduce the amount of labor required for installation.

BACKGROUND OF THE INVENTION

It is known in the art to utilize trace or locator wires to mark the location of underground utility conveyances such as water pipes, gas lines, and the like. The purpose of such locator wires is to provide a way to locate buried utility conveyances, particularly in the case of non-electrically conductive utility conveyances, by detecting a signal passed through the locator wire. Current utility construction practices include placement of an insulated locator wire in a trench containing, for example, a water line or gas main. Commonly, non-electric grade insulated 12 gauge or 14 gauge wire is utilized. By connecting a signal generator such as a line location transmitting device to the locator wire, a line location receiver may detect the signal induced, allowing easy location of an underground system such as a water line or gas main from the surface without need for random digging. This method is utilized by many utility companies to facilitate construction and/or excavation activities, i.e. to allow construction and/or repair work without fear of rupturing existing water lines or gas mains.

A locator wire must be terminated in some fashion to reduce signal bleed or transfer. Current industry practices include connecting the locator wire to existing structures, such as, for example, fire hydrants or gate valves. Another common practice is to extend the locator wire above ground and directly attach it to a utility construction, for example a fire hydrant. Yet another currently employed practice is to connect the locator wire to a short section of electrical ground rod and embed the rod in a concrete pad.

Disadvantageously, all of the above methods allow some level of signal bleed and/or signal transfer from the locator wire to adjacent utility constructions. Such signal bleed and/or transfer can result in difficulty in locating the buried utility construction. It is known that any signal bleed or transfer at or near the point at which a line location transmitter is connected to the locator wire will greatly reduce the distance at which the induced signal can be detected. In addition, the practice of extending the bare locator wire above ground exposes the wire to damage from, e.g., use of the utility construction to which the wire is connected, from mowing operations, or the like, and reduces the effective life of the locator wire. The practice of attaching the wire to a section of electrical ground rod and embedding the rod in concrete is labor intensive in the installation, and also allows signal bleed or transfer. Such signal bleed/transfer at or near the point where the line location transmitting device is connected to the trace wire greatly reduces the distance at which the induced signal may be detected.

Accordingly, there is need in the art for methods for terminating locator wires to provide long-term usage with minimal loss of signal upon operation. The present invention satisfies this need in the art, advantageously providing methods for terminating locator or trace wires which electrically isolate the locator wire and minimize signal bleed or transfer, while requiring less labor for installation than current systems.

SUMMARY OF THE INVENTION

In accordance with the purposes of the present invention as described herein, the present invention provides methods for terminating a locator wire whereby the locator wire is electrically isolated, designed for use with any conventional locator wire. The invention further provides methods for locating an underground utility conveyance using a locator wire, whereby the locator wire is electrically isolated to minimize signal bleed. The present invention may be adapted for use near any known utility conveyance requiring locator wire to ascertain a location thereof, such as water lines, gas mains or lines, and the like.

In one aspect, the present invention provides a method for electrically isolating a locator wire for locating a utility conveyance, comprising the steps of positioning at least one electrically conductive locator wire in substantial alignment with at least a portion of the utility conveyance, and placing an end of the locator wire in electrical communication with an electrically conductive terminal which is separate from the locator wire. The electrically conductive terminal is at least partially enclosed within an electrically isolating sheath, thereby electrically isolating the locator wire. Typically, the terminal will be removably enclosed within the sheath, thereby improving access for maintenance, repair, and replacement. The sheath may include a recess for removably receiving the terminal below a top surface of the sheath to further protect the terminal. The sheath may be unitary in construction, or may comprise at least two interlocking members, allowing capturing a structure such as an above-ground utility construction therebetween.

In one embodiment, the terminal may comprise a body and at least one integral wire tail, which serves for placing the body in electrical communication with the locator wire. The terminal body may comprise an inner core which is detectable by an electromagnetic signal, and an outer coating which is fabricated of a material having increased electrical conductivity relative to the inner core. It will be appreciated that this feature improves ease of detection of the terminal when buried, such as by use of a conventional metal detector, while maximizing the electrical conductivity of the terminal.

In another aspect of the present invention, a method is provided for locating a utility conveyance having a length, such as for example a water line or gas main, comprising positioning at least one electrically conductive locator wire in substantial alignment with at least a portion of the utility conveyance, and placing an electrically conductive terminal in electrical communication with an end of the locator wire, wherein the terminal is separate from the locator wire and further wherein the terminal is at least partially enclosed within an electrically isolating sheath. Next are the steps of placing a signal generator in electrical communication with the terminal and applying a detectable signal to the terminal and therethrough to the locator wire with the signal generator. The signal, and thereby the locator wire and utility conveyance, may be detected with a suitable detector at a selected point along the length of the utility conveyance.

As described above, the terminal may be removably enclosed within the sheath, and may comprise a body and an integral wire tail. The terminal body may be fabricated as described above. The signal applied to the terminal may be electromagnetic, or may be a radio frequency. In one embodiment, the radio frequency may be from about 60 Hz to about 85 KHz.

In yet another aspect of the present invention, a method for locating a utility conveyance is provided, wherein the utility conveyance has a length at least a portion of which is positioned below a surface such as the surface of the ground. The method comprises the steps of placing at least one electrically conductive locator wire in substantial alignment with at least a portion of the utility conveyance, and placing an end of the locator wire in electrical communication with an electrically conductive terminal which is separate from the locator wire. The terminal may be positioned near a structure which extends at least partially above the surface. Suitable structures include, but are not limited to, utility constructions such as fire hydrants, gate valves, risers, and the like. At least a portion of the terminal and a portion of the structure are enclosed within an electrically isolating sheath, whereby the locator wire is electrically isolated. The utility conveyance may then be detected by placing a signal generator in electrical communication with the terminal, applying a detectable signal to the terminal and therethrough to the locator wire, and detecting the signal with a detector at a selected point along the length of the utility conveyance which is positioned below the surface.

As described above, the terminal may be removably enclosed within the sheath. The sheath may include a recess for removably receiving the terminal below a top surface of the sheath, and may be unitary or comprise at least two interlocking members. The electrically conductive terminal is substantially as described above.

In contrast to conventional methods of terminating a locator wire, such as directly attaching the wire to an existing utility construction or to a grounding rod (both of which methods allow signal bleed and expose the locator wire to the environment, risking damage thereto), the present invention allows an electrically isolated connection which is physically protected from damage and which minimizes the risk of signal bleed or transfer to adjacent utilities. Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawing.

DETAILED DESCRIPTION OF THE INVENTION

Figure 1:
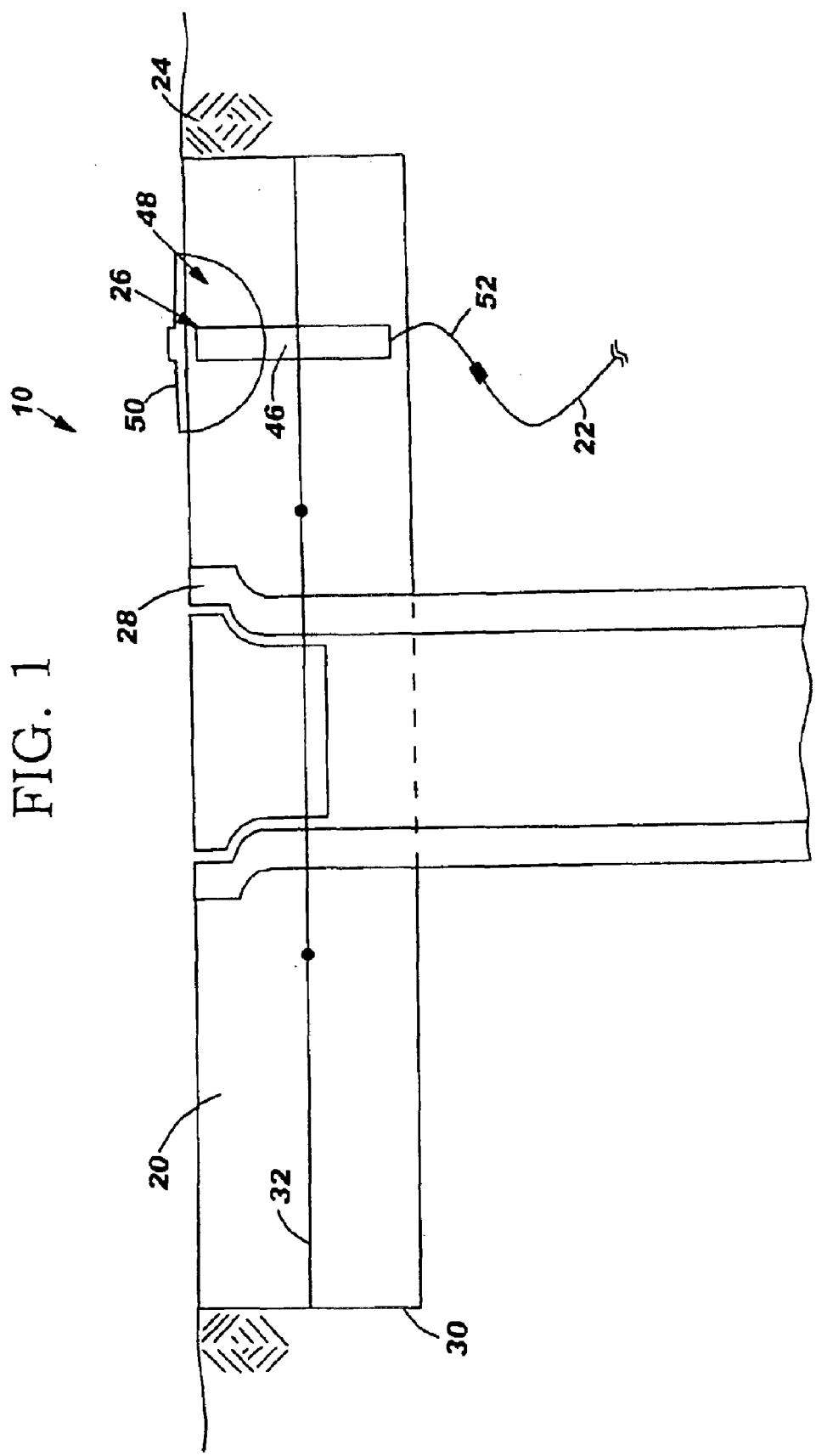
FIG. 1 is a side elevational representation showing a cross-sectional view of the locator wire terminator of the present invention showing a unitary sheath.

As summarized above, the present invention provides methods for terminating a locator wire which are adaptable to any known utility conveyance to be traced using a locator wire, such as a gas or water main. Devices for accomplishing the method of the present invention are described in detail in our co-pending U.S. patent application Ser. No. 10/180,748. Referring to FIG. 1, a device for carrying out the methods of the present invention provides a locator wire terminator 10 comprising a sheath 20 for electrically isolating a locator wire 22 from the ground 24, and an electrically conductive terminal 26 which may be placed in electrical communication with a locator wire 22. In one embodiment, sheath 20 may be configured to surround a utility construction 28, which for purposes of illustration only is depicted in FIG. 1 as a gate valve box of conventional construction. It will be appreciated that sheath 20 may be constructed in any of a number of ways from an number of suitable electrically insulating materials. For example, FIG. 1 depicts a unitary sheath 20, fabricated by placing a form 30 around utility construction 28 and pouring an insulating material therein. In this embodiment, reinforcing rods 32 may be added to add strength to the sheath 20. It will be appreciated that form 30 may be any suitable substance in accordance with the desired shape and size of sheath 20, such as a plastic or cast iron ring. The sheath 20 may be placed so as to be flush with the surface of the ground or raised above the ground surface, as needed. It will also be appreciated that sheath 20 may be fabricated from any suitably insulating material, such as plastic, any of a variety of polymers, rubber, or the like.

Figure 2:
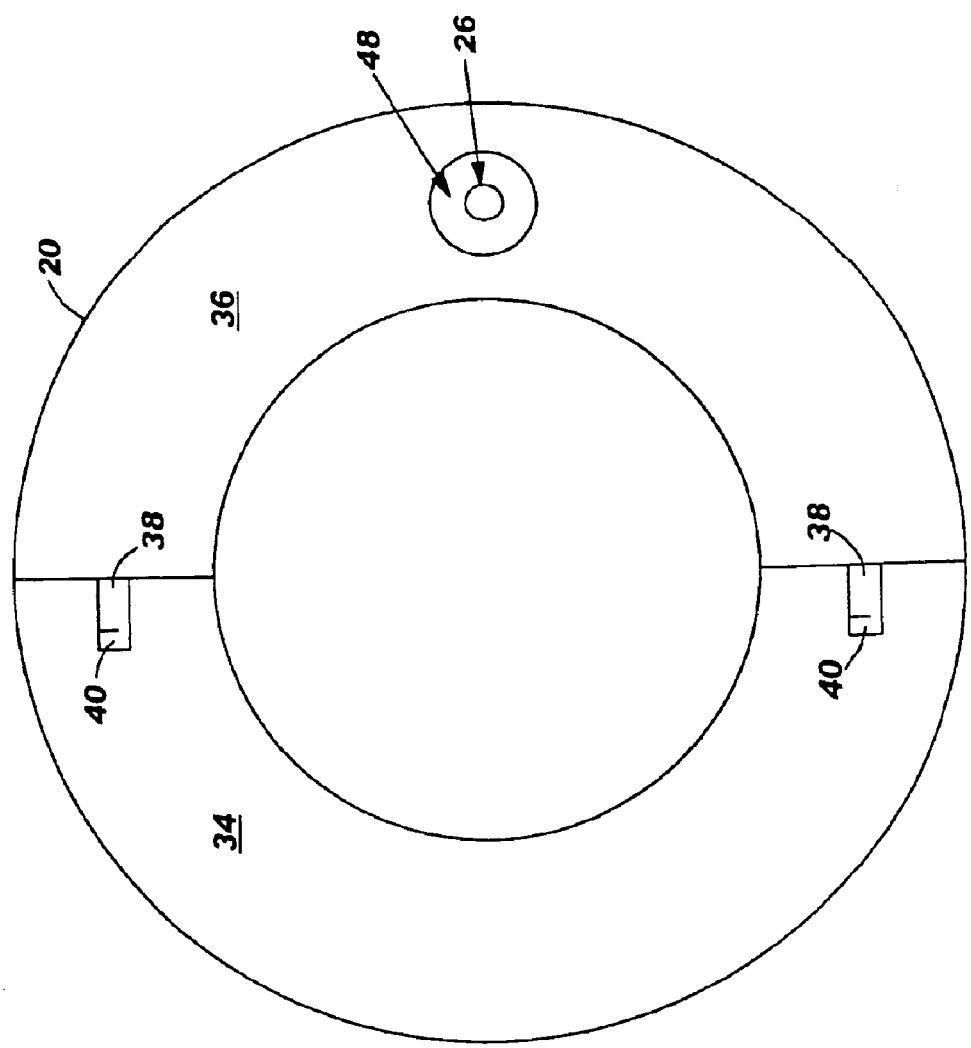
FIG. 2 is a top plan view of the locator wire terminator of the present invention, showing a sheath comprising two interlocking members.

The sheath 20 may alternatively comprise a multi-piece unit of pre-formed members. As shown in FIG. 2, sheath 20 may comprise at least two interlocking members 34, 36 having tabs 38 for engaging cooperating slots 40, whereby sheath 20 captures a utility construction 28 therebetween. It will, however, be appreciated that any suitable method of affixing interlocking members 34, 36 to one another to capture a utility construction 28 between maybe utilized, such as for example tabs 38 and cooperating slots 40 defining snap locks, or an epoxy glue or other suitable adhesive, or any combination. In situations where the utility construction 28 and corresponding sheath 20 are entirely buried, fastening the pieces of the pad together may be unnecessary.

Figure 3:
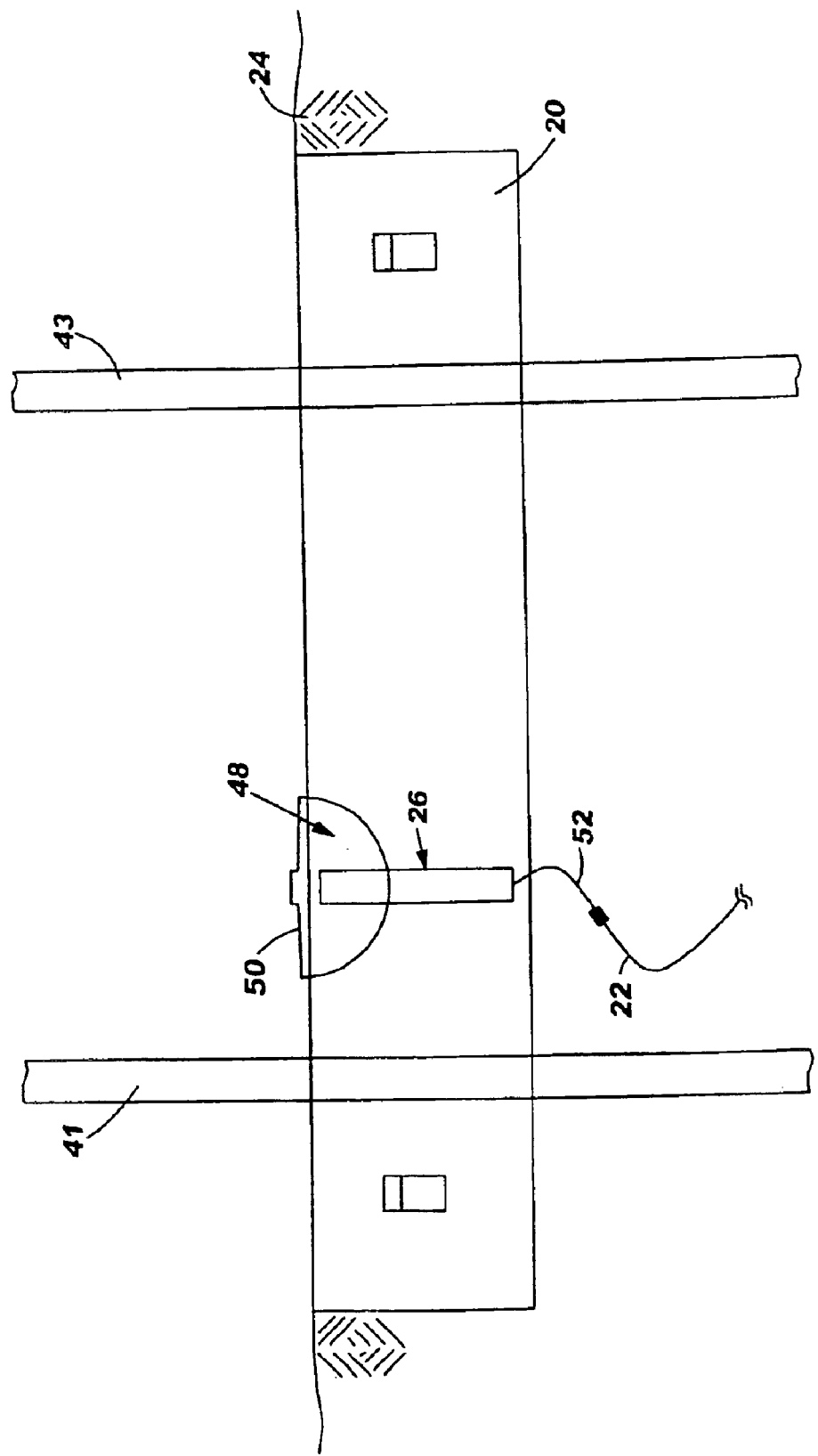
FIG. 3 is a side elevational representation showing a cross-sectional view of the locator wire terminator of the present invention, showing a sheath comprising two interlocking members configured to engage a utility construction comprising dual riser pipes.

The desired shape of the interlocking members will, of course, be determined by the configuration of the utility construction which is to be captured therebetween. For example, as shown in FIG. 3, the multi-piece sheath 20 may be used in conjunction with a different type of utility structure such as paired ground protruding pipes 41, 43 (for example, a gas riser). In this embodiment, the multi-piece sheath 20 may be constructed of any suitable material, typically a lighter material of suitable strength and durability, such as plastics or polymers, for ease of handling and installation.

Sheath 20 may alternatively comprise a unitary, stand-alone unit of any desired shape, such as for example a suitably insulating coating provided on terminal 26. In the embodiment shown in FIG. 4, sheath 20 may include a head 42 and a shaft 44, configured to allow sheath 20 to be driven into the ground at any desired location. It will be appreciated that this embodiment allows tracing and location of a buried utility conveyance such as a gas main or water main which is capped below the surface of the ground, rather than ending at an above-ground or ground surface utility construction. Accordingly, a locator wire 22 may be terminated in accordance with the methods of this invention in the absence of an above-ground or ground level free-standing utility structure. Still further, use of a stand-alone sheath 20 allows sheath 20, and terminal 26 therein, to be protected with a less insulating material such as concrete or metal, while still providing the desired electrical isolation of a locator wire 22 in electrical communication therewith.

The locator wire terminator 10 includes at least one electrically conductive terminal body 46 which is separate from but which may be placed in electrical communication with a conventional locator wire 22. The terminal body 46 may be fabricated from an electrically conductive material, typically any suitable electrically conductive, corrosion-resistant metal. The terminal body 46 may be fabricated from a single metal, a combination of metals, or any suitable alloy. In one embodiment, terminal body 46 includes an inner core and an outer coating. Typically, the inner core may be fabricated from steel or any other material easily detectable by an electromagnetic signal, and the outer coating may be fabricated from copper or any suitable material having increased electrical conductivity relative to the inner core. It will be appreciated that this feature allows detection (via the inner core) of a buried terminal body 46 by any conventional means, such as a metal detector, while retaining electrical conductivity of the terminal body 46. Sheath 20 may include a plurality of terminal bodies 46 for terminating a plurality of locator wires 22, in situations where several different types of utility are located near one another. In use, terminal body 46 will be at least partially enclosed within the sheath 20.

Figure 4:
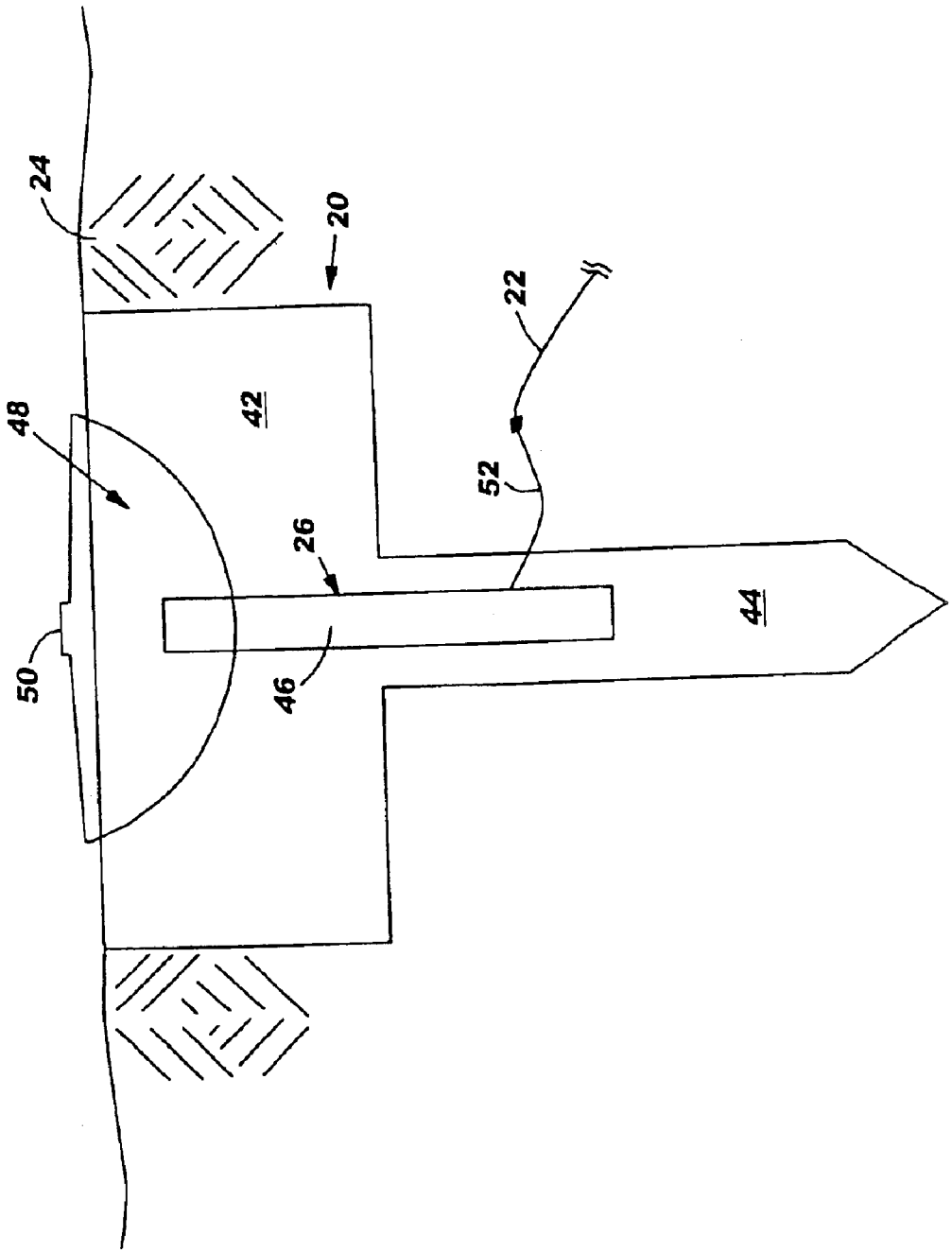
FIG. 4 is a side elevational representation showing a cross-sectional view of the locator wire terminator of the present invention comprising a stand-alone, unitary sheath which may be placed in the ground at a desired location.

Terminal body 46 may be embedded in the sheath 20 such that terminal body 46 is at least partially enclosed in sheath 20 to protect it from damage. In one embodiment as shown in FIGS. 3 and 4, the terminal body 46 may be embedded in a recess 48 in the sheath 20, thereby protecting the terminal body 46 from damage by placing it below the upper surface of the sheath 20, but maintaining accessibility. A cap or lid 50 may be provided for sealing the recess 48, thereby protecting the terminal body 46 from inclement weather and incidental damage. Terminal body 46 may be removably inserted in recess 48 in sheath 20, or may be permanently embedded therein by any suitable means, such as an epoxy glue or any suitable adhesive.

The locator wire 22 may be attached to the terminal body 46 by any conventional means, such as by a clamp, by soldering, or by simply wrapping the locator wire around terminal body 46. Typically, locator wire 22 is placed in electrical communication with terminal body 46 below or near the bottom surface of sheath 20. In one embodiment, terminal body 46 may include an integral wire tail 52 for placing terminal body 46 in electrical communication with a locator wire 22 by any suitable means, such as a conventional underground wire splice kit or by soldering. Typically, wire tail 52 will extend beyond a surface of sheath 20. It will be appreciated that this feature allows terminal body 46 to be placed in electrical communication with a locator wire 22 without need for extending the locator wire above the surface of the ground. In this fashion, the risk of incidental damage to locator wire 22 by, for example, mowing or string trimmers, is reduced or eliminated. It will be appreciated also that a plurality of wire tails 52 (not shown) may be included on terminal body 46, thereby allowing multiple locator wires 22 to be terminated at a single terminal body 46.

In accordance with standard practice in the industry, the entirety or a portion of the sheath 20 of this invention may be differently colored in accordance with the type of utility with which it is paired. It is standard practice in this art to utilize different colors to identify different types of utility constructions. For example, it is known in the art to use the color red to identify electrical utilities, blue to identify water lines, yellow to identify gas mains, and so on. Advantageously, this allows personnel undertaking repair work or other construction to identify the type of utility construction(s) buried nearby, and take appropriate precautionary measures.

Figure 5:
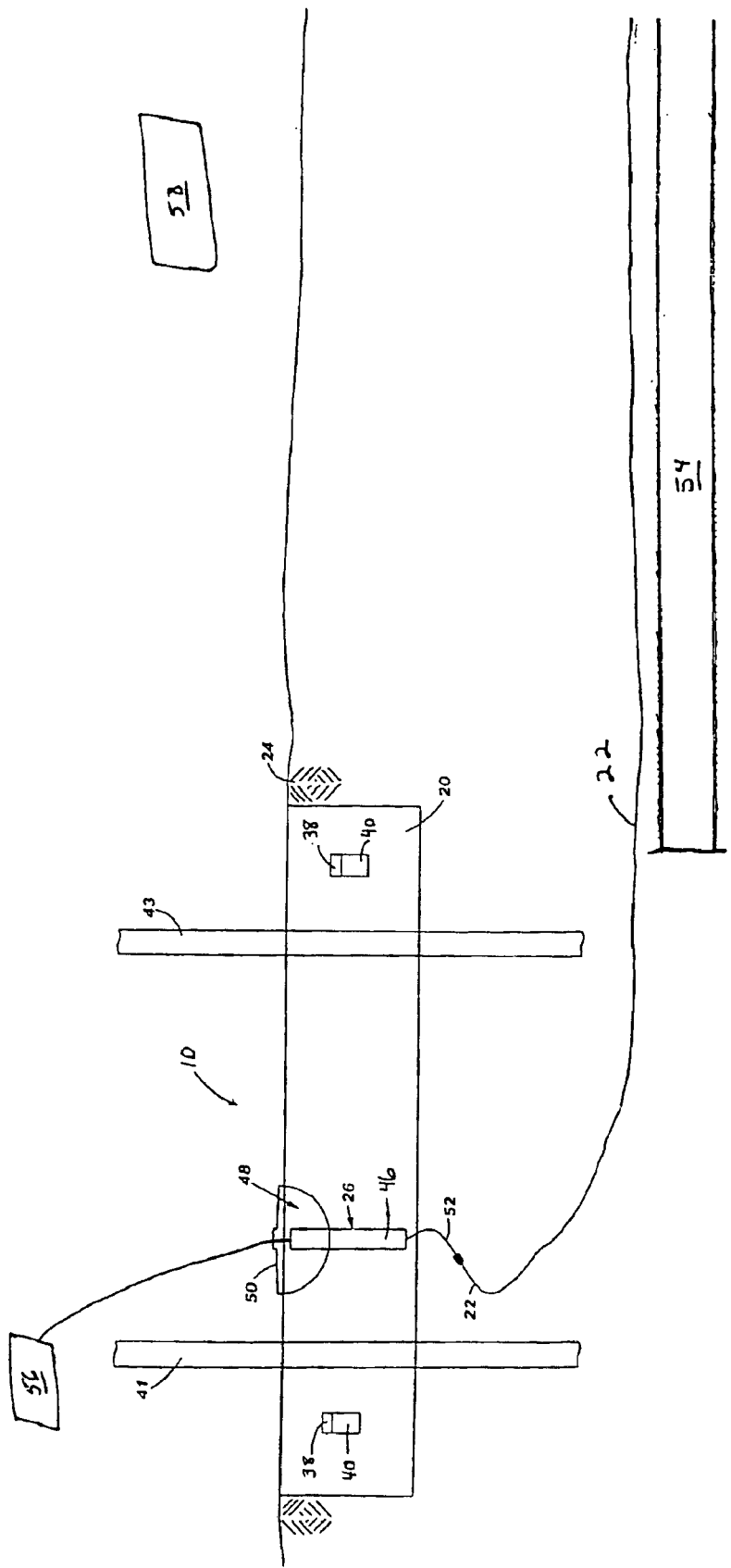
FIG. 5 schematically depicts a method for locating a locator wire placed near a utility pipeline and for locating the pipeline, wherein the locator wire is electrically isolated to minimize signal bleed.

Referring to FIG. 5, it will be appreciated that a method for electrically isolating a locator wire 22 for locating a utility conveyance 54 such as a buried water main or gas line is provided, comprising the steps of positioning the locator wire 22 in substantial alignment with the utility conveyance 54, placing the locator wire 22 in electrical communication with an electrically conductive terminal 26 as described above, and at least partially enclosing the terminal 26 with an electrically isolating sheath 20. The locator wire 22 may be in proximity to the utility conveyance 54, or may be in substantial contact with the conveyance 54. In the depicted embodiment, the locator wire 22 is in electrical communication with the terminal body 46 via an integral wire tail 52 extending from the terminal body 46. It will be appreciated that this method results in an electrically isolated locator wire 22. The terminal body 46, for repair or replacement purposes, may be easily accessed exteriorly by removing cap 50.

A method for locating an underground utility conveyance 54 such as a water line or gas main is also provided, comprising the steps of positioning an electrically conductive locator wire 22 in substantial alignment with a portion of the underground utility conveyance 54, placing one end of the locator wire 22 in electrical communication with an electrically conductive terminal 26, surrounding the electrically conductive terminal 26 with an electrically isolating sheath 20, applying a suitable signal to the terminal 26 and therethrough to the electrically conductive locator wire 22 using a suitable signal generator 56, and detecting the signal, and thereby the location of the locator wire 22 and utility conveyance 54, with a detector 58 at any desired position along the length of utility conveyance 54. In the embodiment depicted in FIG. 5, terminal body 46 is placed in electrical communication with locator wire 22 via wire tail 52. Access to terminal body 46 for purposes of applying a signal is easily achieved by removing cap 50.

In the embodiment depicted in FIG. 5, it will be noted that sheath 20 encloses a portion of terminal 26 and of a utility construction, in this example risers 41, 43. Advantageously, this arrangement allows easy location of terminal 26 by locating risers 41, 43. Further, sheath 20 provides protection for terminal 26 and risers 41, 43 from damage, such as by mowing operations or the like.

Numerous suitable signal generator and detector systems are known in the art for conductive tracing of a buried utility conveyance, such as transmitters for generating an electromagnetic signal, for generating a signal of a particular radiofrequency, and the like. In the case of a signal of a particular frequency, a suitable signal may be applied at a frequency of from about 60 Hz to about 85 KHz.

Thus, in contrast to conventional methods of terminating a locator wire, such as directly attaching the wire to an above-ground utility construction or a grounding rod (both of which allow signal bleed and expose the locator wire, risking damage thereto), the methods of the present invention allow a completely insulated, electrically isolated connection which is physically protected from damage and minimizes the risk of signal bleed or transfer to adjacent utilities. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

What is claimed is:

1. A method for electrically isolating an at least one electrically conductive locator wire for locating a utility conveyance, comprising the steps of:

positioning the at least one electrically conductive locator wire in substantial alignment with at least a portion of the utility conveyance; and placing an end of the at least one electrically conductive locator wire in electrical communication with an electrically conductive terminal which is separate from the at least one electrically conductive locator wire;

wherein the terminal is at least partially enclosed within an electrically isolating sheath;

wherein the at least one electrically conductive locator wire is electrically isolated from the utility conveyance; and wherein the terminal is removably enclosed within the sheath.

2. The method of claim 1, wherein the sheath includes a recess for removably receiving the terminal below a top surface of the sheath.

3. The method of claim 1, wherein the sheath is unitary.

4. The method of claim 1, wherein the sheath comprises at least two interlocking members for capturing a structure therebetween.

5. The method of claim 1, wherein the terminal comprises a body and at least one integral wire tail for placing the body in electrical communication with the at least one electrically conductive locator wire.

6. The method of claim 5, wherein the terminal body comprises an inner core which is detectable by an electromagnetic signal, and an outer coating which is fabricated of a material having increased electrical conductivity relative to the inner core.

7. A method for locating a utility conveyance having a length, comprising the steps of:

positioning at least one electrically conductive locator wire in substantial alignment with at least a portion of the utility conveyance;

placing an electrically conductive terminal in electrical communication with an end of the at least one electrically conductive locator wire, wherein the terminal is separate from the at least one electrically conductive locator wire and further wherein the terminal is at least partially enclosed within an electrically isolating sheath placing a signal generator in electrical communication with the terminal;

applying a detectable signal to the terminal and therethrough to the at least one electrically conductive locator wire with the signal generator; and detecting the signal with a detector at a selected point along the length of the utility conveyance;

wherein the at least one electrically conductive locator wire is electrically isolated from the utility conveyance; and wherein the terminal is removably enclosed within the sheath.

8. The method of claim 7, wherein the electrically conductive terminal comprises a body and at least one integral wire tail for placing the body in electrical communication with the at least one electrically conductive locator wire.

9. The method of claim 8, wherein the terminal body comprises an inner core which is detectable by an electromagnetic signal, and an outer coating which is fabricated of a material having increased electrical conductivity relative to the inner core.

10. The method of claim 7, wherein the signal is electromagnetic.

11. The method of claim 7, wherein the signal is a radio frequency.

12. The method of claim 11, wherein the signal is applied at a frequency of from about 60 Hz to about 85 KHz.

13. A method for locating a utility conveyance having a length, at least a portion of which is positioned below a surface, comprising the steps of:

placing at least one electrically conductive locator wire in substantial alignment with at least a portion of the utility conveyance which is positioned below the surface;

placing an end of the at least one electrically conductive locator wire in electrical communication with an electrically conductive terminal which is separate from the at least one electrically conductive locator wire;

positioning the terminal near a structure which extends at least partially above the surface;

enclosing at least a portion of the terminal and at least a portion of the structure within an electrically isolating sheath, wherein the at least one electrically conductive locator wire is electrically isolated and the terminal and the at least one electrically conductive locator wire are protected from damage;

placing a signal generator in electrical communication with the terminal and applying a detectable signal to the terminal and therethrough to the at least one electrically conductive locator wire; and detecting the signal with a detector at a selected point along the length of the utility conveyance which is positioned below the surface;

wherein the terminal is removably enclosed within the sheath.

14. The method of claim 13, wherein the sheath includes a recess for removably receiving the terminal below a top surface of the sheath.

15. The method of claim 13, wherein the sheath is unitary.

16. The method of claim 13, wherein the sheath comprises at least two interlocking members.

17. The method of claim 13, wherein the electrically conductive terminal comprises a body and at least one integral wire tail for placing the body in electrical communication with the at least one electrically conductive locator wire.

18. The method of claim 17, wherein the terminal body comprises an inner core which is detectable by an electromagnetic signal, and an outer coating which is fabricated of a material having increased electrical conductivity relative to the inner core.

* * * * *